(No Model.) 2 Sheets—Sheet 2.
A. G. PAUL.
DRYING CYLINDER.
No. 526,734. Patented Oct. 2, 1894.
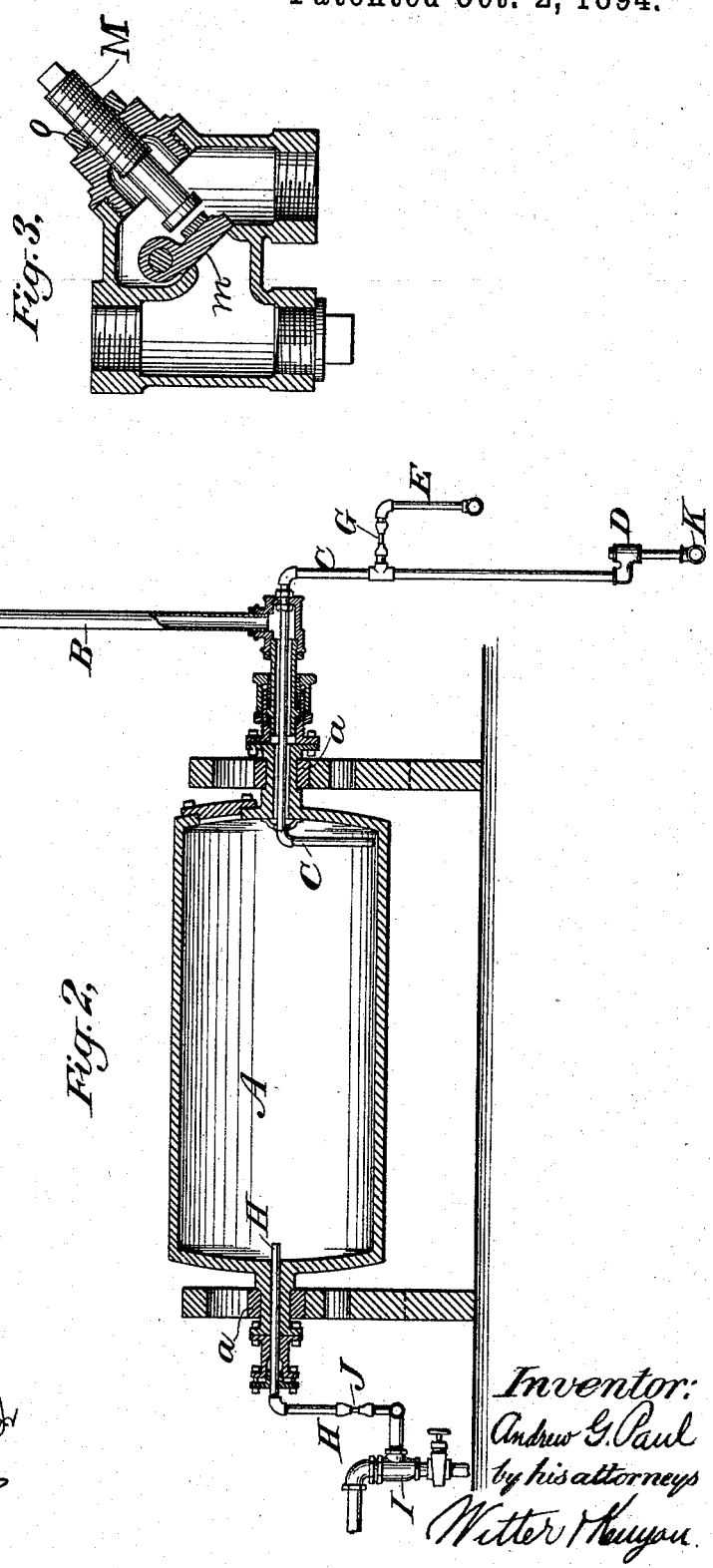
Witnesses:
Nicholas M. Goodlett Jr
Edwin Seger
Inventor:
Andrew G. Paul
by his attorneys
Witter & Kenyon

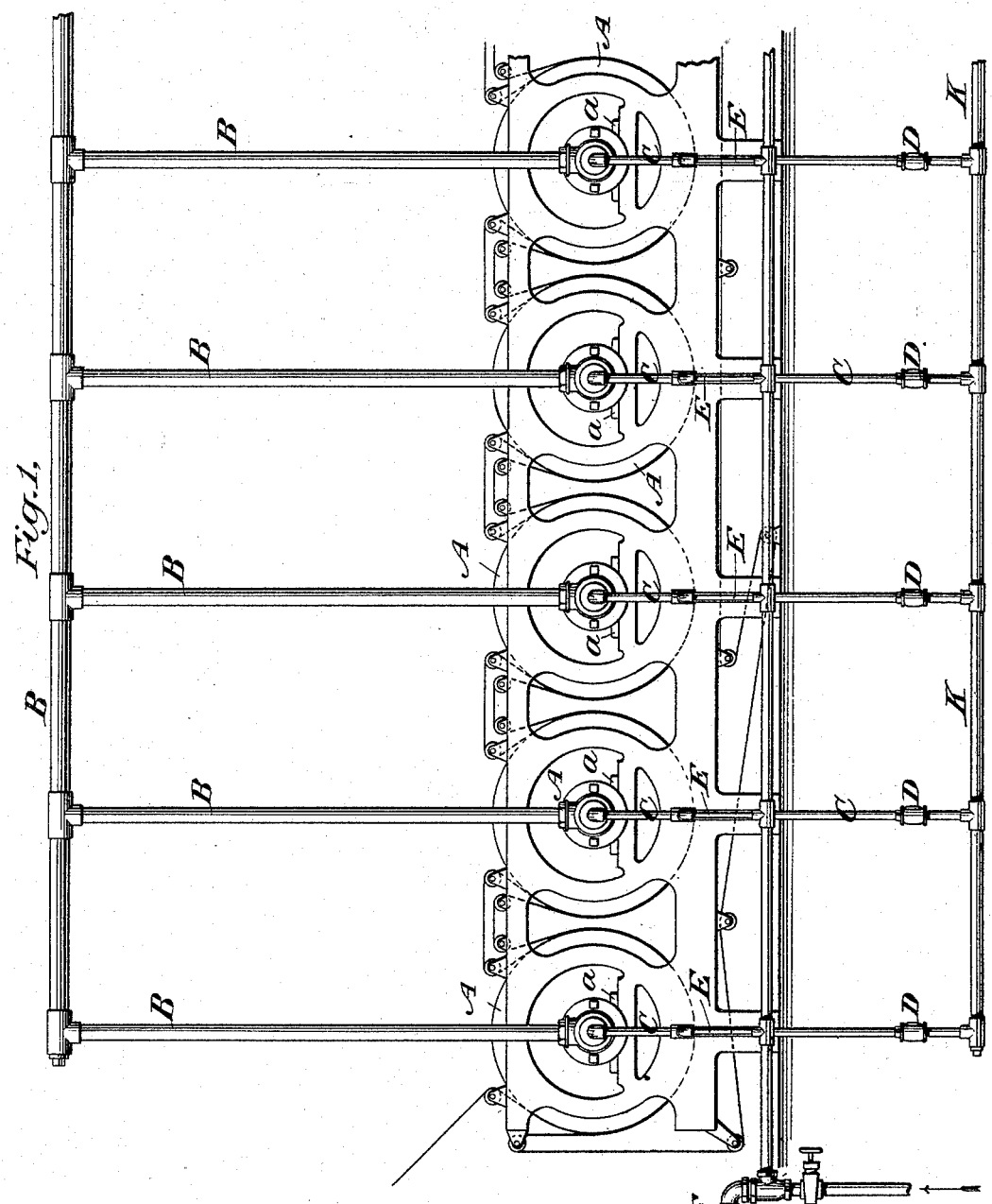

UNITED STATES PATENT OFFICE.

ANDREW G. PAUL, OF BOSTON, MASSACHUSETTS.

DRYING-CYLINDER.

SPECIFICATION forming part of Letters Patent No. 526,734, dated October 2, 1894.

Application filed January 22, 1894. Serial No. 497,601. (No model.)

*To all whom it may concern:*

Be it known that I, ANDREW G. PAUL, a citizen of the United States, and a resident of Boston, in the county of Suffolk and State of Massachusetts, have made an invention of a new and useful Apparatus for Discharging Hot Water and Air from Steam-Heated Cylinders of Drying and Heating Machines, of which the following is a specification.

The drying cylinders of drying machines consist of hollow cylinders revolving upon journals of smaller diameter than the cylinders, so that the cavities of the cylinders extend downward to a lower level than the journals, through which journals a communication can be had with the cavity of the cylinder. Heretofore in such drying machines the cylinders have been heated by means of steam under a pressure above atmospheric pressure and varying from one to sometimes as much as fifty pounds supplied to each cylinder by means of a pipe connected with one of the journals thereof. The steam condensed in the cylinders, and, as the condensed water has necessarily to be discharged through the journals of the cylinders, the water of condensation collected in the lower part of the same. The presence of this water of condensation in the cylinder interfered with the operation of the machine and decreased its efficiency, because the water of condensation reduced the steam heated or effective drying surface of the cylinder. The machines have generally been constructed in such a way that the drying of the paper has been accomplished mainly by the lower part of each of the revolving cylinders, and as the water of condensation collected in the lower part, it tended to decrease the effectiveness of their heating surfaces at the very point where they should be most effective. If this water of condensation should not be removed it would eventually fill half the cylinder, and so decrease the area of the internal surface of the cylinder which would be exposed at any one time to the heating action of the steam that it would be necessary to increase the pressure of the supply steam so as to convey a larger amount of heat to this exposed surface. Whenever the water rose in the cylinder to the level of the steam supply opening, it flowed back into the common steam supply pipe and would have to be discharged from it in some suitable way; but when this happened the common steam supply pipe would become partially filled with water and the water would be apt to be carried into the other cylinders, and the efficiency of the apparatus would be reduced. Instead of increasing the pressure of the supply steam to counteract the effect of the collection of the water of condensation, the number of cylinders was sometimes increased, and this has been done from time to time until now some machines are made with as many as fifty drying cylinders in order that they may dry the paper as fast as is desirable. In order to remove this water of condensation these old machines were in some cases provided with siphon discharge pipes running from near the bottom of each cylinder to a common drain pipe, the end of which common drain pipe was sometimes sealed and sometimes open. The theory of their operation was that the water would be forced out through the discharge pipes by reason of the fact that there was a greater pressure in the cylinder on top of the water in it than there was in the common drain pipe. It was necessary to this operation that the pressure on top of the water in the cylinder should be greater than the pressure in the common drain pipe; but the pressure in the drain pipe was often equal to or greater than the pressure in some one or more of the cylinders, in which case the water would not be discharged from those cylinders. This would sometimes result from the fact that all the water would be driven out from one of the cylinders, and the steam from that cylinder would thus gain access to the common drain pipe and thus equalize the pressure on the inlet and outlet ends of the separate discharge pipes. Then the water would accumulate in these cylinders, and could not be forced into the discharge pipe. Sometimes when the pressure in the common supply pipe was four or five pounds, the pressure in the cylinders would be below atmosphere, because the steam would be condensed in the cylinders more rapidly than it would be supplied from the steam supply pipes thereto. In such cases the water could not be forced through the discharge pipes of the cylinders.

In some cases, by reason of the condensation of the steam in some one or more of the cylinders more rapidly than it was supplied thereto, the water from the common drain pipe would flow into the cylinder and fill the same to a greater or less extent, thereby greatly reducing its efficiency.

Another cause of trouble in controlling and regulating the temperature of the cylinders was the presence and accumulation of air therein. The presence of air in the cylinders would decrease by so much the space for the steam to occupy, and therefore the working capacity of the cylinders.

In these machines it is of great importance that the cylinders should remain at the same or a uniform temperature for a considerable period of time, that is to say, that the heat of the cylinders should not vary materially from time to time. It is of great importance to have perfect control over the temperature of the cylinders at all times. It has been practically impossible heretofore to secure these results, because it has been practically impossible to discharge the hot water as fast as it accumulated therein.

It will be apparent from what I have said, that in order to work such drying cylinders in the most economical and most satisfactory way, it is necessary to control in some certain and positive manner the discharge of the water of condensation, and to remove the air. The present invention is designed to accomplish these results.

My improved apparatus is fully represented in the accompanying drawings which show a paper drying machine.

In the accompanying drawings Figure 1 is a front elevational view of a well known type of paper drying machine, showing five drying cylinders. More than five cylinders are usually employed in such machines, but the number shown in Fig. 1 is sufficient for the purpose of enabling me to describe the present invention. Fig. 2 is a vertical section through the axis of one of the cylinders. The cylinders are all constructed in the same manner. Fig. 3 shows a form of valve to regulate the amount of water discharged from the discharge pipe.

Referring to the drawings, A represents one of the drying cylinders of an ordinary paper drying machine. This cylinder is mounted in suitable bearings at $a$ $a$ in which it revolves.

B is the steam supply pipe for admitting the steam from any suitable source into the interior of the cylinder. This pipe is connected with the journal at one end of the cylinder, as represented in Fig. 2.

C is a discharge pipe through which the water of condensation is discharged from the cylinder. This pipe passes through one of the journals of the cylinder and its inner end extends preferably down nearly to the bottom of the cylinder, or far enough to enable the quantity of water in the cylinder to be kept at such a point as may be desired, or substantially all removed. The outer or discharge end of this discharge pipe is provided at its lower end with a trap preferably a valve device to prevent ingress at that point. In the form of apparatus shown in the drawings at Figs. 1 and 2 this trap is formed by an ordinary check valve D.

K is a common drain pipe for the water of condensation, with which the separate discharge pipes from the separate cylinders are all connected.

E is an escape pipe. It is connected at one end with the discharge pipe C, above the point to which the water of condensation must rise in the discharge end of the discharge pipe to pass through the trap. I find in practice that a point below the highest part of the discharge pipe, say six inches or more, is the best place at which to connect the escape pipe with the discharge pipe. At the other end of the escape pipe I provide some suitable means for keeping up the discharge through this pipe, such for example as an ejector for producing a positive discharge by means of a jet of fluid, as represented at F. The escape pipe is provided with a restricted passage or opening G. This may be formed by some suitable valve, or it may be a restricted passage in the pipe itself. The object of this restricted passage is to limit the quantity of vapor or air passing through the escape pipe.

H is an air pipe which extends into the cylinder through one of its journals. It is preferably provided with an exhauster at its outer end, as represented at I. The purpose of this pipe and exhauster is to remove the air from the cylinder. It is also provided preferably with a restricted opening or with a valve of any suitable form. An automatic valve to work by expansion by heat may be used upon the air pipe, but I prefer to reduce the size of the pipe itself as at J, so as to form a restricted passage.

In cases where the system is run under a pressure above the atmosphere, I prefer to use upon the discharge pipe in place of an ordinary check valve, which is represented at D, as forming the trap a check valve provided with a regulating device which may be set to prevent the valve from discharging more than a given quantity of water in a given period of time. In Fig. 3 is shown a check valve having such a regulating device.

The regulating device consists of a threaded spindle M, passing through the threaded cap of the valve, and adapted to be screwed in or out so as to regulate the distance between the inner end of the spindle and the valve disk $m$. The inner end of the spindle thus acts as a stop to prevent the valve disk $m$ from opening beyond the point at which the stop is set.

$o$ is an ordinary lock nut to lock the spindle in any desired position. By thus regulating the extent to which the valve disk *m* can be opened, the amount of water discharged through the valve can be controlled.

Each cylinder of the machine is constructed in the manner already described. The discharge pipes from the cylinders connect with the common drain pipe K from which the water is conducted to any point desired.

The operation of my improved apparatus is as follows: When the machine is first started the cylinders are full of air. It is necessary to remove this air and to accomplish this result the air pipe H is opened and when an exhauster is used it is started. The air contained within the cylinder will pass out through this air pipe. At the same time the valve in the steam supply pipe is opened and the supply steam is admitted to the cylinder. The steam at once begins to condense and the water of condensation drops or flows down to the bottom of the cylinder and collects at that point. As soon as a sufficient quantity of water has collected to reach up above or seal the inner end of the discharge pipe, the exhauster connected with the escape pipe is put into operation. It will be understood of course that the exhauster of the escape pipe may be started at the same time as the exhauster of the air pipe, or as soon as the steam is let into the cylinder, in which case it will serve at the outset to assist in removing the air. When the water in the cylinder has sealed the inner end of the discharge pipe, if the exhauster on the escape pipe is in operation, the air or other contents of the escape pipe will be drawn out slowly through the exhauster, producing a partial vacuum or pressure lower than that within the cylinder between the exhauster and the restricted passage or opening of the escape pipe. As soon as this partial vacuum or decreased pressure is produced in the escape pipe the air and some of the other contents in the discharge pipe will slowly pass out through the restricted opening of the escape pipe. By reason of the fact that this opening or passage is restricted, the air or other contents of the discharge pipe will be prevented from flowing out from the discharge pipe quickly. As the discharge pipe becomes partially exhausted, the hot water from the drying cylinder will rise in the discharge pipe C to its highest point and will then flow down in a current toward the discharge end thereof; and as the opening or passage of the escape pipe G is out of the direct path of the water as it flows down the discharge pipe, the greater part or the whole of such water flows downward past the escape pipe and collects gradually in the discharge end of the discharge pipe until it rises high enough to pass through the trap at the discharge end of this pipe, after which the water begins to discharge therefrom separated from the air and vapor which pass out through the escape pipe. The escaping current of hot water and vapor from the cylinder is thus divided between two discharge orifices, the one at the discharge end of the discharge pipe for the greater part or the whole of the hot water substantially unmixed with air or vapor, and the other formed by the escape pipe for the vapor with or without air and with or without a small portion of the condensed water; and, as will be noticed from the description above, these two discharge orifices are at different levels. As the escape passage from the discharge pipe C is restricted, the escape of the vapor is slow as compared with what it would be if there should be a free escape passage of the full capacity of the discharge pipe. Moreover, as the escape passage from the discharge pipe C is at one side thereof, it is out of the direct path of the hot water downward to the trap at the lower or discharge end of said discharge pipe. When the trap at the discharge end of the discharge pipe is formed by a check valve, the hot water collects until the column of water is sufficient to open the check valve and discharge itself. In this way the water of condensation is discharged automatically and certainly whenever it collects in the cylinder in sufficient quantities to rise above the inlet end of the discharge pipe. The cylinder is kept substantially free of water and substantially its entire surface is utilized for the purpose of heating, the steam admitted into the cylinder having access to substantially every part of the surface of the inside of the cylinder. The restricted passage or opening in the escape pipe may be varied in size, according to the conditions under which the machine is operated. Thus in the different machines which have been operated by me in accordance with this invention, I have varied the size of the restricted opening of the escape pipe from about one thirty-second to about one-eighth of an inch in diameter.

By trapping the discharge end of the discharge pipe C of each drying or heating cylinder separately, the entrance of steam or water through the discharge pipe is prevented; for even if the water should all be discharged from one cylinder and the supply steam admitted to the common drain pipe K, the traps upon the discharge pipes of the other cylinders would prevent the pressure in the drain pipe from extending into their discharge pipes. This trapping of each discharge pipe separately is one feature of my invention.

The operation of the check valve and controlling device shown in Fig. 3 is to enable the discharge of water from the discharge pipe of any particular cylinder to be regulated according to the amount of hot water collecting in that cylinder, and thus to prevent the lower end of the discharge pipe from being entirely emptied of water, as it might be if no controlling device were used and the system were run under pressure. The different drying cylinders of a series employed to dry paper have a different rate of condensation, for the work performed by each cylinder is governed by the location of the cylinder, that is to say, the cylinders next to the wet end or where the pulp comes to the driers, have to do considerably more work than the cylinder next to the calender end. By graduating or controlling the quantity of water that flows from each discharge pipe, the steam is prevented from passing from that discharge pipe into the common drain pipe. When this regulating device is not used and there should happen to be an excess of steam pressure in the drying cylinder, the steam would be blown right through the discharge trap or valve.

The escape pipes E from the different drying cylinders may all be connected with a single exhauster, as shown in Fig. 1, and the air pipes H may also be connected with a single exhauster. In some cases it may be expedient to have a single exhauster with which all the escape pipes and all the air pipes are connected.

If the steam is supplied to each drying or heating cylinder at a pressure above the atmosphere always sufficient to force the air and water out of the cylinder against the atmospheric pressure, the exhausters are not necessary to the practice of my invention.

My invention when used with the drying cylinders of a paper machine results in great economy in the operation of that machine. It makes it possible to run the machine efficiently with supply steam at atmospheric pressure or a pressure below the atmosphere. Hence the drying cylinders can be supplied with exhaust steam from an engine or other source, and the work accomplished by means of steam which would otherwise be wasted. The water of condensation and the air are removed from the cylinders as effectively and thoroughly when the steam is under a pressure less than that of the atmosphere as when it is above the same. Substantially the entire interior surface of each cylinder is in active and constant operation in the work of heating or drying. Under these conditions a supply of exhaust steam under a pressure less than that of the atmosphere will in many cases furnish all the heat that is required and will accomplish better and more uniform results than have been accomplished without my improvement by a supply of steam directly from the boiler under a considerable degree of pressure. In this way my improvement secures a large saving in fuel. My improvement also secures a uniformity and certainty of operation not possible with former drying or heating cylinders. The accumulation of air and water in the cylinder is prevented. The space within the cylinder to which the steam has access is practically constant. This being so, and it being comparatively easy to regulate the quantity of steam supplied to the cylinder, the cylinder can be kept at a uniform degree of temperature, or its temperature can be regulated as may be desired. When such machines are used without the application of my invention, the water and air accumulate in the cylinder, and are present in different quantities at different times, and thus cause a constant variation in the temperature of the cylinder not in any way under the control of the operator. This is a serious defect in the operation of such a machine. My invention remedies this defect.

Having fully described my invention, what I desire to secure by Letters Patent is—

1. The combination of a drying or heating cylinder with a discharge pipe connected with one of the journals thereof, and a trap consisting of a valve device at the lower end of the said discharge pipe, substantially as before set forth.

2. The combination of two or more drying or heating cylinders, separate discharge pipes, one connected with each cylinder, a trap consisting of a valve device at the outer end of each discharge pipe, and a common drain pipe into which the discharge pipes empty, substantially as before set forth.

3. The combination of two or more drying or heating cylinders, separate discharge pipes, one connected with each cylinder, a trap consisting of a valve device at the outer end of each discharge pipe, a regulating device to regulate the amount of water that can be discharged from each discharge pipe, and a common drain pipe into which the discharge pipes empty, substantially as before set forth.

4. The combination of a drying or heating cylinder, a discharge pipe connected with one of the journals thereof, a trap at the outer end of the said discharge pipe and an escape pipe connected with the said discharge pipe above the outer end thereof, substantially as before set forth.

5. The combination of a drying or heating cylinder, a discharge pipe connected with one of the journals thereof, a trap at the outer end of the said discharge pipe, an escape pipe connected with the said discharge pipe above the outer end thereof, and an exhausting device with which said escape pipe is connected, substantially as before set forth.

6. The combination substantially as before set forth, of a drying or heating cylinder, a discharge pipe connected with one of the journals thereof, a trap at the outer end of the said discharge pipe, an escape pipe connected with the said discharge pipe above the outer end thereof, the said escape pipe being provided with a restricted passage.

7. The combination substantially as before set forth, of a drying or heating cylinder, a discharge pipe connected with one of the journals thereof, a trap at the outer end of the said discharge pipe, an escape pipe connected with the said discharge pipe above the outer end thereof, the said escape pipe being provided with a restricted passage, and an exhausting device with which said escape pipe is connected.

8. The combination of a drying or heating cylinder, a discharge pipe connected with one of the journals thereof, a trap consisting of a valve device at the outer end of the said discharge pipe, an escape pipe connected with the said discharge pipe above the outer end thereof, and an exhausting device with which said escape pipe is connected, substantially as before set forth.

9. The combination substantially as before set forth of a drying or heating cylinder, a discharge pipe connected with one of the journals thereof, a trap consisting of a valve device at the outer end of the said discharge pipe, an escape pipe connected with the said discharge pipe above the outer end thereof, the said escape pipe being provided with a restricted passage, and an exhausting device with which said escape pipe is connected.

10. The combination substantially as before set forth, of a drying or heating cylinder, a discharge pipe connected with one of the journals thereof, a trap at the outer end of the said discharge pipe, an escape pipe connected with the said discharge pipe above the outer end thereof, and a regulating device to regulate the amount of water discharged from the said discharge pipe.

11. The combination substantially as before set forth of a drying or heating cylinder, a discharge pipe connected with one of the journals thereof, a trap at the outer end of the said discharge pipe, an escape pipe connected with the said discharge pipe above the outer end thereof, an exhausting device with which said escape pipe is connected, and a regulating device to regulate the amount of water discharged from the said discharge pipe.

12. The combination substantially as before set forth of a drying or heating cylinder, a discharge pipe connected with one of the journals thereof, a trap at the outer end of the said discharge pipe, an escape pipe connected with the said discharge pipe above the outer end thereof, the said escape pipe being provided with a restricted passage, and a regulating device to regulate the amount of water discharged from the said discharge pipe.

13. The combination substantially as before set forth of a drying or heating cylinder, a discharge pipe connected with one of the journals thereof, a trap at the outer end of the said discharge pipe, an escape pipe connected with the said discharge pipe above the outer end thereof, the said escape pipe being provided with a restricted passage, an exhausting device with which said escape pipe is connected, and a regulating device to regulate the amount of water discharged from said discharge pipe.

14. The combination of a heating or drying cylinder with a steam supply pipe, an air discharge pipe, and a water discharge pipe, the said three pipes being connected with the journals of the said cylinder, substantially as before set forth.

15. The combination of a heating or drying cylinder with a steam supply pipe, an air pipe, an exhausting device with which the said air pipe is connected, and a water discharge pipe, the said three pipes being connected with the journals of the said cylinder, substantially as before set forth.

16. The combination substantially as before set forth, of a heating or drying cylinder with a steam supply pipe, an air pipe, an exhausting device with which the said air pipe is connected, a water discharge pipe, the said three pipes being connected with the journals of the said cylinder and a trap at the outer end of the water discharge pipe.

17. The combination substantially as before set forth, of a heating or drying cylinder with a steam supply pipe, an air pipe, an exhausting device with which the said air pipe is connected, a water discharge pipe, the said three pipes being connected with the journals of the said cylinder, a trap at the outer end of the water discharge pipe, and an escape pipe connected with the water discharge pipe above the outer end thereof.

18. The combination substantially as before set forth, of a heating or drying cylinder with a steam supply pipe, an air pipe, an exhausting device with which the said air pipe is connected, a water discharge pipe, the said three pipes being connected with the journals of the said cylinder, a trap at the outer end of the water discharge pipe, an escape pipe connected with the water discharge pipe above the outer end thereof, and an exhausting device with which the said escape pipe is connected.

19. The combination of a heating or drying cylinder with a steam supply pipe, an air pipe, a water discharge pipe, a trap at the outer end of said water discharge pipe, an escape pipe connected with the water discharge pipe above the discharge end thereof, and provided with a restricted passage, substantially as before set forth.

20. The combination substantially as before set forth of a heating or drying cylinder with a steam supply pipe, an air pipe, a water discharge pipe, a trap at the outer end of said water discharge pipe, an escape pipe connected with the water discharge pipe above the discharge end thereof, and provided with a restricted passage, and an exhausting device with which the said escape pipe is connected.

21. The combination of two or more drying or heating cylinders, separate discharge pipes, one connected with each cylinder, a trap at the outer end of each discharge pipe, separate escape pipes connected with the said discharge pipes above the outer end thereof and severally provided with restricted passages, and a common exhausting device with which all the said escape pipes are connected, substantially as before set forth.

22. The combination of two or more drying or heating cylinders, separate steam supply pipes therefor connected with the journals of the said cylinders, separate air pipes also connected with the journals of the said cylinders and severally provided with restricted passages, and a common exhausting device with which all of the said air pipes are connected, substantially as before set forth.

ANDREW G. PAUL.

Witnesses:
 EDWIN SEGER,
 ROBERT N. KENYON.